Dec. 31, 1963     W. M. SCOTT, JR     3,116,385
CIRCUIT CONNECTION FOR CIRCUIT BREAKERS
HAVING CURRENT LIMITING FUSES
Filed Jan. 23, 1961     3 Sheets-Sheet 1

INVENTOR.
WILLIAM M. SCOTT, JR.
BY
OSTROLENK, FABER, GERB & SOFFEN
ATTORNEYS

Dec. 31, 1963 W. M. SCOTT, JR 3,116,385
CIRCUIT CONNECTION FOR CIRCUIT BREAKERS
HAVING CURRENT LIMITING FUSES
Filed Jan. 23, 1961 3 Sheets-Sheet 2

INVENTOR.
WILLIAM M. SCOTT, JR.
BY
OSTROLENK, FABER, GERB & SOFFEN
ATTORNEYS 3,116,385
CIRCUIT CONNECTION FOR CIRCUIT BREAKERS HAVING CURRENT LIMITING FUSES
William M. Scott, Jr., Bryn Mawr, Pa., assignor to I-T-E Circuit Breaker Company, Philadelphia, Pa., a corporation of Pennsylvania
Filed Jan. 23, 1961, Ser. No. 84,168
2 Claims. (Cl. 200—114)

My invention relates to a circuit connection for circuit breakers having current limiting fuses connected in series therewith, and more specifically relates to a circuit connection wherein the current limiting fuse is placed on the line side of the circuit interrupter, and the circuit breaker trip unit is placed on the load side of the circuit interrupter with the circuit breaker contacts interposed between the two.

Circuit interrupting devices comprised of a combined circuit breaker unit and circuit limiting fuse in series therewith are well known to the art and are shown, for example, in U.S. Patent No. 2,924,688, issued February 9, 1960, entitled "End Mounting of a Current Limiting Device Associated With a Circuit Breaker," in the name of William Harold Edmunds and assigned to the assignee of the present invention.

The order of connection of these devices in a circuit has been limited by the inherent construction of the devices. Thus, it is possible to place the current limiting fuses on the line side of the interrupter with the circuit breaker contacts on the load side and the circuit breaker trip unit interposed between the two, or it is possible to place the circuit breaker contacts on the line side with the current limiting fuses on the load side, and the circuit breaker trip unit interposed between the two.

The reason for this inherent limitation is that the circuit breaker construction is such that the circuit breaker trip unit is immediately adjacent the circuit breaker contacts. Furthermore, because of the manner in which the fuses are mechanically interlocked with respect to the circuit breaker, a striker pin ejected from the fuse responsive to its operation is immediately adjacent the trip unit so that the striker pin can cause operation of the trip unit. Because of these two limitations, the two aforementioned connections have been the only connections used.

It is highly desirable that the trip unit is not connected at the line side of the circuit breaker either directly or with the current limiting fuses connected between the trip unit and the line side since the trip unit will remain energized even though the circuit breaker contacts are open.

It is further disadvantageous to have the current limiting fuses connected behind the circuit breaker contacts, particularly since the operation of the current limiting fuses has been found to generate a high voltage pulse during its operation, which pulse is impressed across the contacts and can cause a failure within the circuit breaker. If such a failure were to occur in front of the current limiting fuses, there would be nothing left to limit the fault current flowing through the possible flashover within the circuit breaker created by the high voltage pulse from an operating fuse.

The principle of the present invention is to provide a circuit connection whereby the trip unit is on the load side of the circuit breaker contacts, while at the same time the current limiting fuses are placed on the line side of the circuit breaker contacts whereby a high voltage pulse created during fuse operation will not cause a subsequent flow of fault current through the circuit breaker portion of the interrupter if a failure is created by this high voltage pulse.

In order to accomplish this, it has been necessary to depart from the present concept of having the trip unit immediately adjacent the current limiting fuses. Thus, in the present invention, the current limiting fuse housing is contained on one side of the circuit breaker while a connecting means such as a mechanical link extends from the striker pin of the current limiting fuses to the trip unit on the other side of the circuit breaker contacts.

Accordingly, and with this novel structure, the trip unit is isolated from the line terminals when the circuit breaker is open, and furthermore, the operation of the current limiting fuses from the system creates a positive disconnect for the complete circuit interrupter which follows behind the fuses.

Accordingly, a primary object of this invention is to provide a novel circuit connection and circuit arrangement for circuit interrupters comprised of a series connected current limiting fuse and circuit breaker.

A further object of this invention is to provide a current limiting circuit interrupter wherein the current limiting fuses and trip unit are on alternate sides of the circuit breaker contacts.

A further object of this invention is to provide a novel circuit arrangement for a current limiting circuit interrupter wherein the trip unit is on the load side of the circuit breaker contacts and the current limiting fuses are on the line side of the circuit breaker contacts.

These and other objects of my invention will become apparent from the following description when taken in connection with the drawings, in which.

Figure 3:
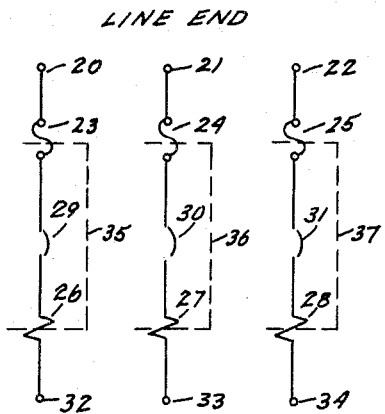

FIGURE 3 schematically illustrates the circuit arrangement for a current limiting circuit interrupter constructed in accordance with the present invention.

FIGURE 4 is a side view of a current limiting circuit interrupter and schematically illustrates the manner in which the interrupter is constructed in accordance with the present invention.

FIGURE 5 is a top view of the end of the circuit interrupter housing of FIGURE 4, and illustrates the current limiting fuse housing with the cover removed.

Figure 6:
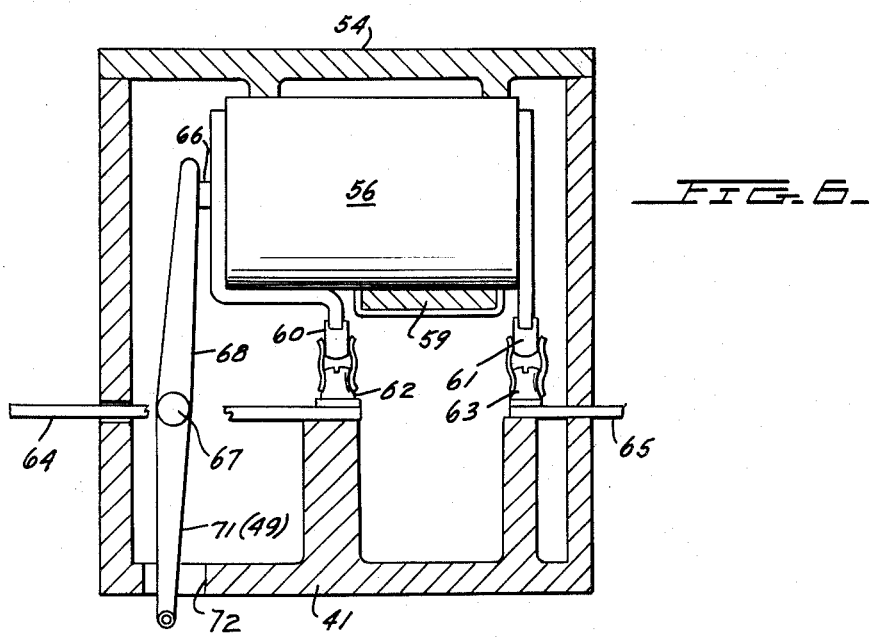

FIGURE 6 is a side cross-sectional view of FIGURE 5 when taken across the lines 6—6 in FIGURE 5, and particularly illustrates the manner in which the striker pin of the current limiting fuse can deliver an operating signal to the remotely located trip unit of the circuit breaker.

Figure 7:
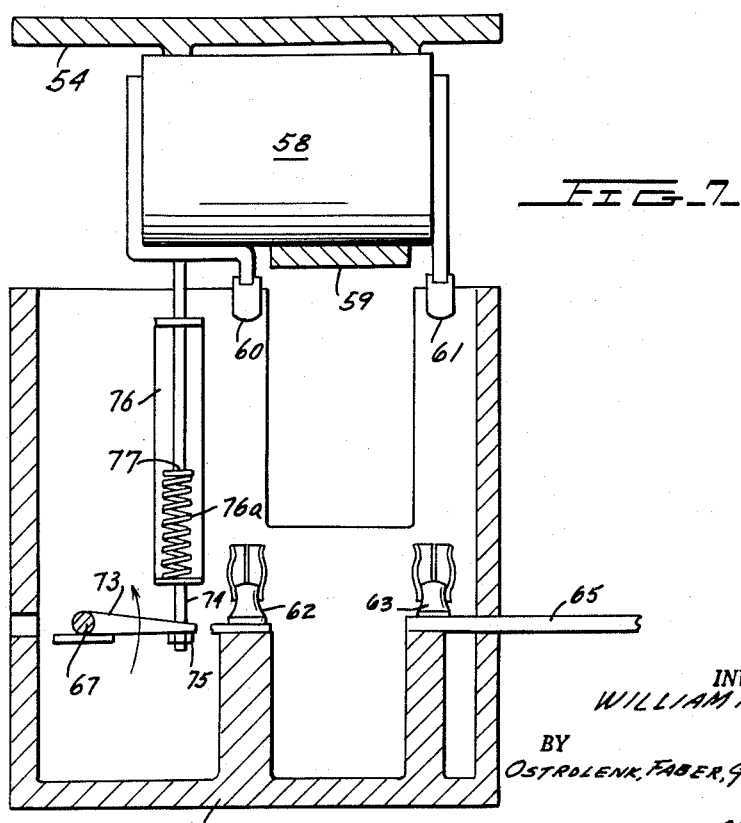

FIGURE 7 is a side cross-sectional view of FIGURE 5 when taken across the lines 7—7 in FIGURE 5, and particularly illustrates the manner in which the cover of the current limiting fuse housing is interlocked with the trip unit.

Figure 1:
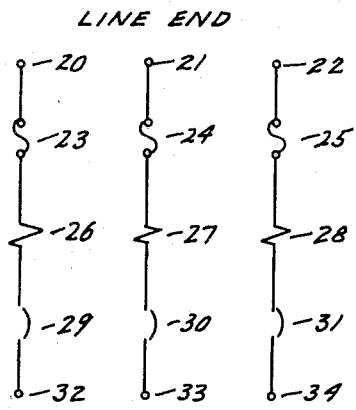
FIGURE 1 shows a first typical prior art type of circuit arrangement.

Referring now to FIGURE 1, I have schematically illustrated one typical circuit arrangement commonly used in the prior art wherein the line terminals 20, 21 and 22 at the line end of the circuit interrupter are connected first to removable current limiting fuses 23, 24 and 25 respectively. The circuit breaker of the circuit interrupter then includes trip units 26, 27 and 28 and circuit breaker contacts 29, 30 and 31 respectively where trip units 26, 27 and 28 are directly connected to fuses 23, 24 and 25 respectively. The contacts 29, 30 and 31 then lead to the load terminals 32, 33 and 34.

In this arrangement the fuses 23, 24 and 25 of each phase can serve as disconnects for the complete system. Furthermore, if there is a failure below the fuses and within the circuit breaker during circuit interruption, the fault current from phase-to-phase can eventually be limited by the current limiting fuses in the fault circuit.

The circuit of FIGURE 1 is disadvantageous, however, in that the trip units are continually energized even when the circuit breaker contacts are open. To avoid this condition, the circuit arrangement can be altered to that shown in FIGURE 2 wherein the circuit breaker contacts 29, 30 and 31 are placed ahead of trip units 26, 27 and 28 so that the current limiting fuses 23, 24 and 25 are on the load side of the interrupter.

With this arrangement, however, it has been found that when the fuses 23, 24 or 25 operate, they deliver an extremely high voltage pulse to their respective contacts which can cause a failure of the contact. Furthermore, in the event of a phase-to-phase fault above the current limiting fuses, there is no means for limiting the fault current since the fuses are below the fault and out of the fault circuit.

Figure 2:
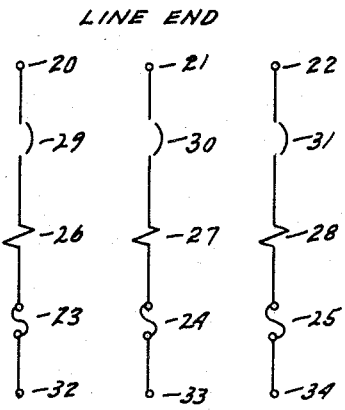
FIGURE 2 shows a second possible prior art circuit arrangement.

It is to be noted that the connections of FIGURES 1 and 2 are substantially the only connections previously thought available, since in the conventional construction of these devices it is necessary for the trip unit and circuit breaker contacts to be adjacent one another, and it is similarly necessary that the current limiting fuses and trip units be physically adjacent one another.

I have found that by departing from this conventional concept, and by placing the circuit breaker contacts between the trip unit and current limiting fuse, it is possible to both isolate the trip units from the line end of the circuit breaker by the circuit breaker contacts, and to keep the current limiting fuse in front of the circuit breaker contacts.

This novel arrangement is shown in FIGURE 3 wherein the current limiting fuses 23, 24 and 25 are at the line end terminals, while the trip units 26, 27 and 28 are immediately adjacent the load terminals. It is possible to physically remove these elements from one another merely by providing a mechanical linkage schematically illustrated in FIGURE 3 as linkage 35, 36 and 37, or some other interconnecting means to interconnect trip units with their respective fuses. By way of example, connections 35, 36 and 37 could represent a mechanical connection from the striker pin of the current limiting fuses to the tripper bar associated with the trip units. In a like manner, however, electrical circuitry which is energized responsive to operation of the fuses could be electrically connected to cause operation of the trip units, and any other desired interconnection between the fuses and trip units may be utilized.

A typical manner in which the interlock may be carried out is set forth in FIGURES 4 through 7.

Referring first to FIGURE 4, I have shown a typical molded case circuit breaker 40, contained within housing 42, which may be of the general type shown in above noted U.S. Patent 2,924,688. In accordance with the present invention, however, a current limiting fuse housing 41 is connected at the line end of the circuit breaker or at the end which is on the opposite side of the contacts than are the trip units of the various phases of the circuit breaker. It will be noted that in the past, the current limiting fuse housings are normally immediately adjacent the circuit breaker trip unit and on the same side of the trip unit as the circuit breaker contacts.

In FIGURE 4, the circuit through the circuit interrupter begins at a load terminal 42 through the trip unit such as trip unit 43 of the phase in question, the movable contact schematically shown for this phase and its cooperating stationary contact 45, and thence through a current limiting fuse which will be described more fully hereinafter within the fuse housing 41 to the line terminal 46 for the phase.

A standard tripper bar 47 is schematically shown as being interlocked with respect to trip unit 43, it being understood that operation of this tripper bar 47 will cause operation of the movable contact 44 as well as the remaining contacts of the other phases in the standard and well known manner.

In order that this tripper bar 47 may be operated responsive to either operation of the current limiting fuses within housing 41 or the removal of the current limiting fuses from this housing, a tension link 48 extending from a movable lever 49 which will be discussed more fully hereinafter is connected to a rocker arm 50 pivotally mounted on fixed pivot 51. A linkage means, comprising push pin 52, extends from interlock extension 53 of tripper bar 47 through aperture 52' and external to circuit breaker housing 42, to engage rocker arm 50. It is to be understood that the individual members of circuit breaker 40 are located to provide an unobstructed passageway intermediate interlock extension 53 and aperture 52', for the reception of push pin 52. Hence, the leftwardly extending arm of rocker arm 50 drives push pin 52 responsive to its rotation in a clockwise direction to pick up the interlock extension 53 of tripper bar 47 to thus cause operation of the circuit breaker contacts 44 and 45 to a disengaged position responsive to operation of lever 49.

It is to be understood that this is only one of several manners in which the current limiting fuse operation may be coordinated with the operation of the contacts.

The current limiting fuse housing is shown in a top view in FIGURE 5 with the cover 54 removed so that the fuses 56, 57 and 58 may be seen. As is shown in FIGURE 7, the cover 54 is constructed to carry fuses 56, 57 and 58 as by providing a retaining clamp bar 59 which clamps the current limiting fuses 56, 57 and 58 to the cover 54 so that they can be simultaneously removed.

As shown in FIGURE 6 for the case of current limiting fuse 56, the current limiting fuse is provided with a pair of disconnect contacts 60 and 61 which engage tulip clip-type disconnect contacts 62 and 63 respectively which are electrically connected to conductors 64 and 65 respectively which extend through openings in housing 41. Conductor 64 is internally connected in any desired manner to stationary contact 45 of FIGURE 4, while conductor 65 is connected to the line end terminal such as line end terminal 46 of FIGURE 4.

Each of the current limiting fuses, such as current limiting fuse 56, have the typical ejectable striker pin such as striker pin 66 which is ejectable responsive to operation of the current limiting fuse containing it. An auxiliary tripper bar 67 having upwardly extending arms such as arms 68, 69 and 70 of FIGURE 5 is pivotally mounted in housing 41 with the projecting arms 68, 69 and 70 being biased toward the striker pins of fuses 56, 57 and 58 respectively. The upwardly extending arm 69 is further provided with a lower extending portion 71 which extends below shaft 67 and through a slot 72 in housing 41, as shown in FIGURE 6, this lower extending member 71 being similar to the lever 49 referred to in FIGURE 4.

In view of the above structure, it will be apparent that if the current limiting fuse 56, for example, operates, its striker pin 66 is ejected to the left to thereby drive upper extending portion 68 of auxiliary tripper bar 67 to the left so that lower portion 71 is moved to the right. This will cause the tension link 48 of FIGURE 4 to rotate rocker-arm 50 in a clockwise direction, and thus cause operation of the circuit breaker contacts.

Accordingly, by means of a relatively simple mechanical linkage, I am able to retain the mechanical coordination between the current limiting fuses and the circuit breaker contacts, even though the fuses are electrically connected in front of the circuit breaker, and the trip unit is positioned so that it may be isolated by the circuit breaker contacts.

If it is further desired to cause the circuit breaker contacts to be automatically opened when the fuses are disconnected, I have provided a further extension 73 on auxiliary tripper bar 67 which has an opening in its end through which a rod 74 is passed, as shown in FIG- URE 7. The rod 74 has a nut 75 thereon which is normally slightly removed from the extending arm 73. A spring cage 76 is then secured to the side of housing 41, as shown in FIGURES 5 and 7, and carries a spring 76a therein, the lower end of which is seated at the bottom of cage 76 and the upper end of which is attached to rod 74 by pin 77.

The upper end of rod 74 normally abuts against the lower surface of cover 54 when this cover is in the position of FIGURE 6. When the cover is removed, however, as shown in FIGURE 7, rod 74 may now be moved upwardly under the action of compression spring 76a so that nut 75 picks up the outer end of link 73 to rotate it in a counterclockwise direction. This will cause auxiliary tripper bar 67 to rotate counterclockwise and thus cause lower end 71 of FIGURE 6 or lever 49 of FIGURE 4 to move to the right to thereby cause the subsequent operation of the circuit breaker contacts.

Accordingly, even though the novel highly desired circuit arrangement set forth above is provided, it is still possible to provide the same mechanical interlocks which are available to the prior art structures where the fuse housing is mounted directly adjacent the circuit breaker trip units.

Although I have described preferred embodiments of my novel invention, many variations and modifications will now be obvious to those skilled in the art, and I prefer therefore to be limited not by the specific disclosure herein but only by the appended claims.

I claim:

1. A circuit interrupter comprising a line terminal, a fuse, a pair of circuit breaker contacts, a trip unit for said pair of circuit breaker contacts and a load terminal, said fuse being electrically connected between said line terminal and said pair of circuit breaker contacts; said trip unit being electrically connected between said pair of circuit breaker contacts and said load terminal; a mechanical interlock means; said interlock means directly extending from said fuse to said trip unit; said interlock means being operable to initiate disengagement of said pair of circuit breaker contacts responsive to operation of said fuse; said fuse defining a means electrically isolating said circuit breaker contacts and trip unit from said line responsive to operation thereof; first housing means containing said pair of circuit breaker contacts and trip unit, and second housing means containing said fuse; said trip unit including a main tripper bar having an interlock extension; said first housing means including an aperture means providing an interlock access; said circuit interrupter having an unobstructed passageway from said aperture means to said interlock extension; said mechanical interlock means including a first linkage means consisting of a single arm extending from said interlock extension, along said passageway and through said aperture means, external to said first housing means; a second linkage means extending from said second housing to the external region of said first linkage means; motion translating means interconnecting said first linkage means to a first end of said second linkage means; said second housing including an interlock tripper means, including an externally extending portion actuable responsive to predetermined circuit conditions; the second end of said second linkage means connected to said externally extending portion of said interlock tripper means, whereby the actuation of said interlock tripper means is directly communicated to said main tripper bar.

2. A multiphase circuit interrupter comprising a pair of circuit breaker contacts, a fuse, and a trip unit for each phase; said trip unit, pair of circuit breaker contacts and fuse for each phase being electrically connected in series; said pair of cooperable contacts of each phase being interposed between its respective fuse and trip unit, the end of said series circuit including said trip unit defining the load end of said circuit interrupter; a mechanical interlock means, said interlock means directly extending from said fuse of each of said phases to at least a portion of said trip unit; said interlock means being operable to initiate disengagement of each of said pairs of circuit breaker contacts responsive to operation of any of said fuses; the end of said series circuit including said fuse defining the line end of said circuit interrupter; each of said fuses defining a means electrically isolating its associated phase from said line responsive to operation thereof; first housing means containing said pairs of circuit breaker contacts and trip units, and second housing means containing said fuses; at least one of said trip units including a main tripper bar having an interlock extension; said first housing means including an aperture means providing an interlock access; said circuit interrupter having an unobstructed passageway from said aperture means to said interlock extension; said mechanical interlock means including a first linkage means consisting of a single arm extending from said interlock extension, along said passageway and through said aperture means, external to said first housing means; a second linkage means extending from said second housing to the external region of said first linkage means; motion translating means interconnecting said first linkage means to a first end of said second linkage means; said second housing including an interlock tripper means, including an externally extending portion actuable responsive to predetermined circuit conditions; the second end of said second linkage means connected to said externally extending portion of said interlock tripper means, whereby the actuation of said interlock tripper means is directly communicated to said main tripper bar.

References Cited in the file of this patent

UNITED STATES PATENTS

| | | |
|---|---|---|
| 2,376,789 | Leonard | May 22, 1945 |
| 2,888,535 | Edmunds | May 26, 1959 |
| 2,919,328 | Kozacka | Dec. 29, 1959 |
| 2,920,164 | Edsall | Jan. 5, 1960 |
| 2,924,686 | Edmunds | Feb. 9, 1960 |
| 2,950,370 | Swain | Aug. 23, 1960 |